(12) United States Patent
Kito

(10) Patent No.: US 11,762,267 B2
(45) Date of Patent: Sep. 19, 2023

(54) LIGHT SOURCE APPARATUS AND PROJECTOR

(71) Applicant: SEIKO EPSON CORPORATION, Tokyo (JP)

(72) Inventor: Satoshi Kito, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/580,789

(22) Filed: Jan. 21, 2022

(65) Prior Publication Data

US 2022/0236631 A1 Jul. 28, 2022

(30) Foreign Application Priority Data

Jan. 22, 2021 (JP) .................................. 2021-008994

(51) Int. Cl.
*G03B 21/20* (2006.01)
*H04N 9/31* (2006.01)
*G02B 26/00* (2006.01)

(52) U.S. Cl.
CPC ......... *G03B 21/204* (2013.01); *G02B 26/008* (2013.01); *H04N 9/3161* (2013.01)

(58) Field of Classification Search
CPC ...... G03B 21/00–64; H04N 9/31–3197; G02B 26/008; F21V 13/00–14; F21V 9/00–45; F21V 7/00–30; F21V 5/00–10; F21V 3/00–12; F21V 1/00–26
See application file for complete search history.

(56) References Cited

U.S. PATENT DOCUMENTS

| | | | |
|---|---|---|---|
| 2011/0310362 A1 | 12/2011 | Komatsu | |
| 2016/0274353 A1* | 9/2016 | Ando | ................. C03C 17/007 |
| 2021/0024818 A1* | 1/2021 | Kito | ..................... C09K 11/02 |

FOREIGN PATENT DOCUMENTS

| | | |
|---|---|---|
| JP | 2012-3923 | 1/2012 |
| JP | 2021-18340 | 2/2021 |

* cited by examiner

*Primary Examiner* — Bao-Luan Q Le
*Assistant Examiner* — Christopher A Lamb, II
(74) *Attorney, Agent, or Firm* — Dority & Manning, P.A.

(57) ABSTRACT

A light source apparatus according to an aspect of the present disclosure includes an excitation light source that outputs excitation light, a ceramic phosphor that has a first surface and a second surface, converts in terms of wavelength part of the excitation light outputted from the excitation light source and incident via the first surface to generate fluorescence, and causes the fluorescence to exit via the second surface, and a substrate that supports the first surface of the ceramic phosphor. The excitation light outputted from the excitation light source is incident on an exposed portion of the first surface of the ceramic phosphor that is the portion exposed via the substrate. The distance in the exposed portion from an irradiated region irradiated with the excitation light to the substrate is 0.34 mm or greater.

8 Claims, 5 Drawing Sheets

LIGHT SOURCE APPARATUS AND PROJECTOR

The present application is based on, and claims priority from JP Application Serial Number 2021-008994, filed Jan. 22, 2021, the disclosure of which is hereby incorporated by reference herein in its entirety.

BACKGROUND

1. Technical Field

The present disclosure relates to a light source apparatus and a projector.

2. Related Art

There has been a proposed light source apparatus using fluorescence emitted from a phosphor when the phosphor is irradiated with excitation light outputted from a light source. JP-A-2012-3923 discloses a transmissive phosphor unit that emits fluorescence via the surface opposite from the surface on which excitation light is incident. In the phosphor unit, the phosphor is provided on a transparent substrate.

In the phosphor unit disclosed in JP-A-2012-3923, in which the excitation light passes through the transparent substrate and enters the phosphor, part of the excitation light is reflected off the interface between the phosphor and the transparent substrate to form stray light in the transparent substrate, resulting in a decrease in the excitation light utilization efficiency.

SUMMARY

To solve the problem described above, according to an aspect of the present disclosure, there is provided a light source apparatus including a substrate, a transmissive ceramic phosphor supported by one surface of the substrate and having an exposed surface that is part of a first surface exposed via the substrate, and an excitation light source that radiates excitation light to the exposed surface of the ceramic phosphor, and the distance from an irradiated region of the exposed surface that is the region irradiated with the excitation light to the substrate is 0.34 mm or greater.

According to another aspect of the present disclosure, there is provided a projector including the light source apparatus according to the aspect described above, a light modulator that modulates light outputted from the light source apparatus in accordance with image information to form image light, and a projection optical apparatus that projects the image light.

DESCRIPTION OF EXEMPLARY EMBODIMENTS

Figure 1:
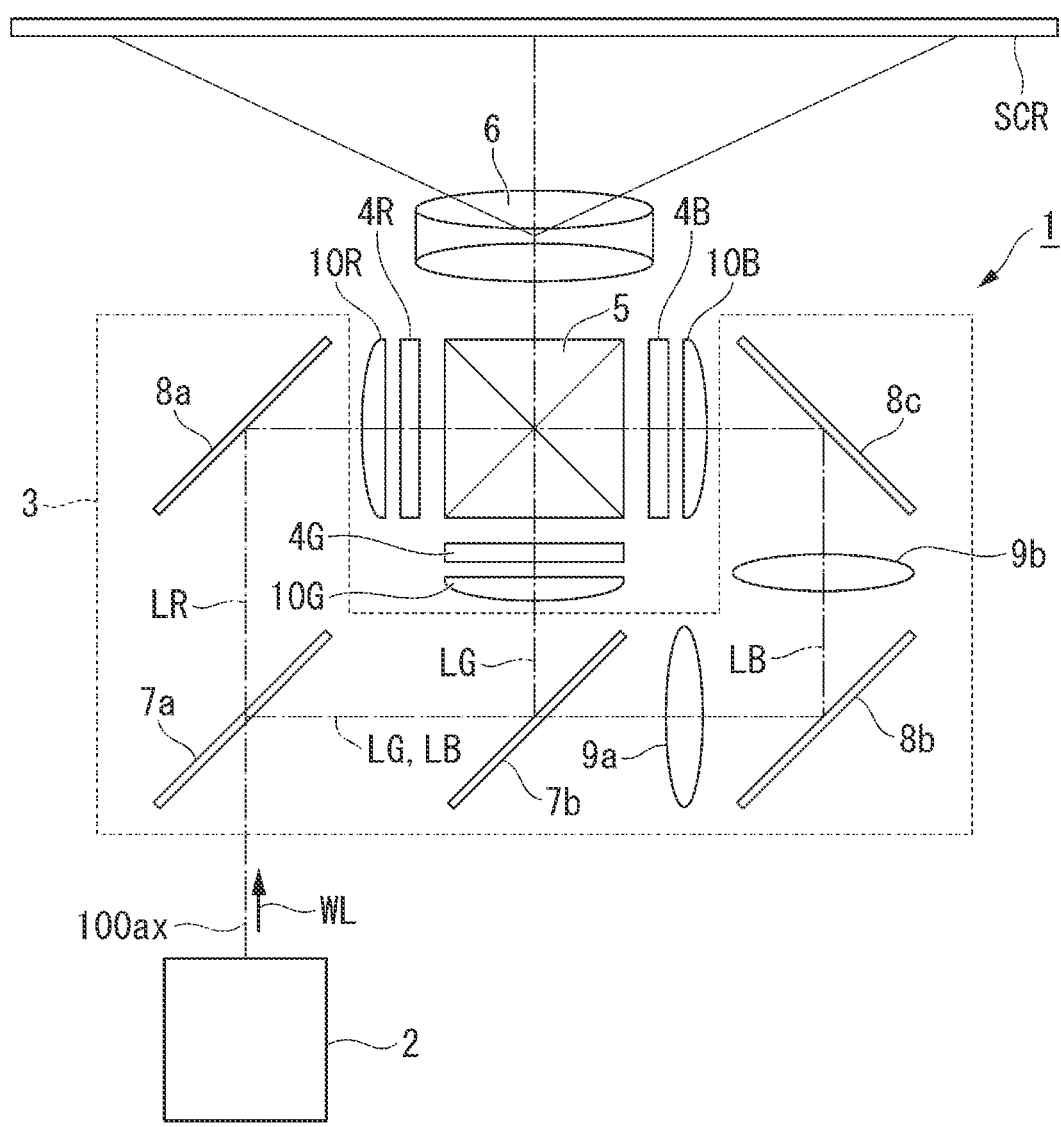
FIG. 1 shows a schematic configuration of a projector according to a first embodiment.

Embodiments of the present disclosure will be described below in detail with reference to the drawings.

In the drawings used in the description below, a characteristic portion is enlarged for convenience in some cases for clarity of the characteristic thereof, and the dimension ratio and other factors of each component are therefore not always equal to actual values.

First Embodiment

Figure 2:
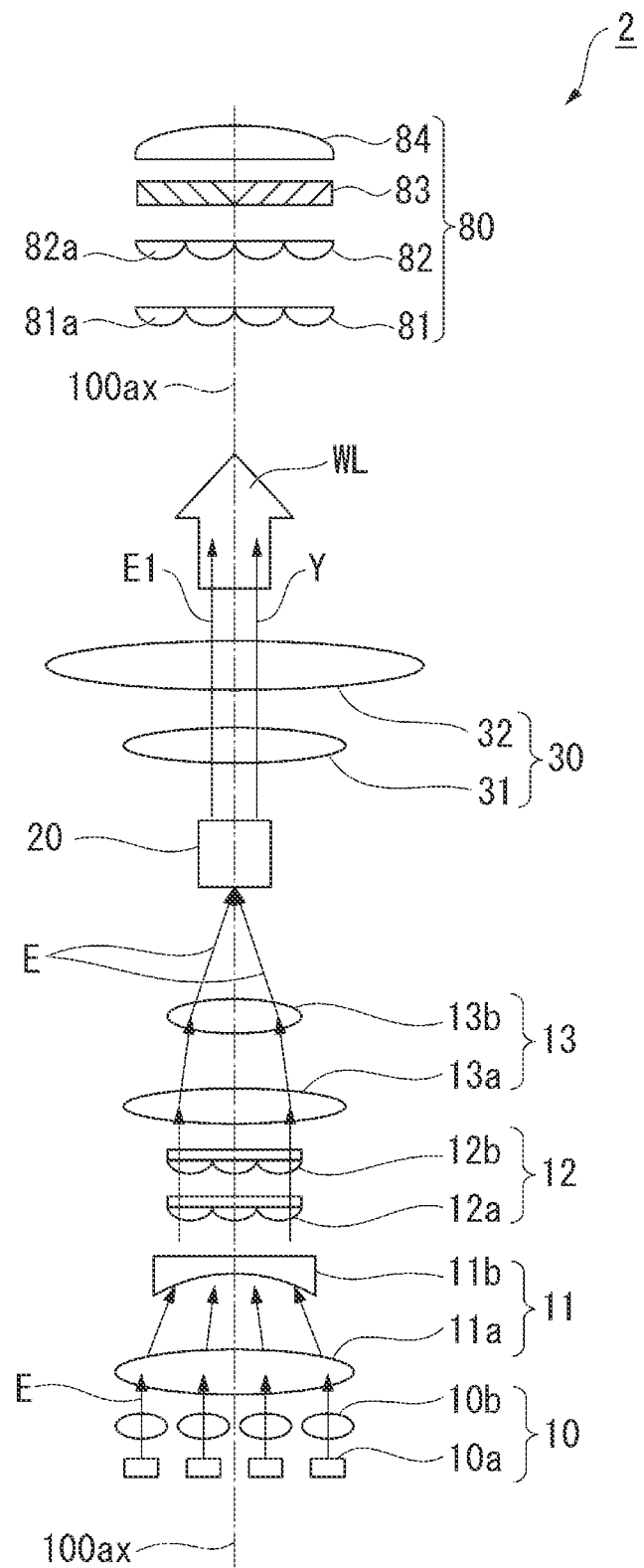
FIG. 2 shows a schematic configuration of a light source apparatus.

FIG. 1 shows a schematic configuration of a projector according to a first embodiment. FIG. 2 shows a schematic configuration of a light source apparatus.

A projector 1 according to the present embodiment is a projection-type image display apparatus that displays video images on a screen SCR, as shown in FIG. 1. The projector 1 includes a light source apparatus 2, a color separation system 3, light modulators 4R, 4G, and 4B, a light combining system 5, and a projection optical apparatus 6.

The light source apparatus 2 outputs white illumination light WL toward the color separation system 3.

The color separation system 3 separates the illumination light WL outputted from the light source apparatus 2 into red light LR, green light LG, and blue light LB. The color separation system 3 includes a first dichroic mirror 7a, a second dichroic mirror 7b, a first total reflection mirror 8a, a second total reflection mirror 8b, a third total reflection mirror 8c, a first relay lens 9a, and a second relay lens 9b.

The first dichroic mirror 7a separates the illumination light WL from the light source apparatus 2 into the red light LR and the other light (green light LG and blue light LB). The first dichroic mirror 7a transmits the red light LR and reflects the other light (green light LG and blue light LB). On the other hand, the second dichroic mirror 7b reflects the green light LG and transmits the blue light LB to separate the other light (green light LG and blue light LB) into the green light LG and the blue light LB.

The first total reflection mirror 8a is disposed in the optical path of the red light LR and reflects the red light LR having passed through the first dichroic mirror 7a toward the light modulator 4R. On the other hand, the second total reflection mirror 8b and the third total reflection mirror 8c are disposed in the optical path of the blue light LB and guide the blue light LB having passed through the second dichroic mirror 7b toward the light modulator 4B. The green light LG is reflected off the second dichroic mirror 7b toward the light modulator 4G.

The first relay lens 9a and the second relay lens 9b are disposed in the optical path of the blue light LB on the light exiting side of the second total reflection mirror 8b. The first relay lens 9a and the second relay lens 9b have the function of compensating optical loss of the blue light LB resulting from the fact that the optical path length of the blue light LB is longer than the optical path lengths of the red light LR and the green light LG.

The light modulator 4R modulates the red light LR in accordance with image information to form image light corresponding to the red light LR. The light modulator 4G modulates the green light LG in accordance with image information to form image light corresponding to the green light LG. The light modulator 4B modulates the blue light LB in accordance with image information to form image light corresponding to the blue light LB.

The light modulators 4R, 4G, and 4B are each, for example, a transmissive liquid crystal panel. Polarizers (not shown) are disposed on the light incident and exiting sides of each of the liquid crystal panels.

Field lens 10R, 10G, and 10B are disposed on the light incident side of the light modulators 4R, 4G, and 4B, respectively. The field lens 10R, 10G, and 10B parallelize the red light LR, the green light LG, and the blue light LB to be incident on the respective light modulators 4R, 4G, and 4B.

The image light from the light modulator 4R, the image light from the light modulator 4G, and the image light from the light modulator 4B enter the light combing system 5. The light combining system 5 combines the image light corresponding to the red light LR, the image light corresponding to the green light LG, and the image light corresponding to the blue light LB with one another and outputs the combined image light toward the projection optical apparatus 6. The light combining system 5 is formed, for example, of a cross dichroic prism.

The projection optical apparatus 6 is formed of a projection lens group, enlarges the combined image light from the light combining system 5, and projects the enlarged image light toward the screen SCR. Enlarged video images are thus displayed on the screen SCR.

Light Source Apparatus

The configuration of the light source apparatus 2 will be subsequently described.

The light source apparatus 2 includes an excitation light source 10, an afocal optical system 11, a homogenizer optical system 12, a condenser optical system 13, a wavelength converter 20, a pickup optical system 30, and a uniform illumination optical system 80, as shown in FIG. 2.

The excitation light source 10 is formed of a plurality of semiconductor lasers 10a, which each output blue excitation light E formed of laser light, and a plurality of collimator lenses 10b. The plurality of semiconductor lasers 10a are arranged in an array in a plane perpendicular to an illumination optical axis 100ax. The collimator lenses 10b are arranged in an array in a plane perpendicular to the illumination optical axis 100ax in correspondence with the semiconductor lasers 10a. The collimator lenses 10b each convert the excitation light E outputted from the corresponding semiconductor laser 10a into parallelized light.

The afocal optical system 11 includes, for example, a convex lens 11a and a concave lens 11b. The afocal optical system 11 reduces the luminous flux diameter of the excitation light E, which is formed of a parallelized luminous flux outputted from the excitation light source 10.

The homogenizer optical system 12 includes, for example, a first multi-lens array 12a and a second multi-lens array 12b. The homogenizer optical system 12 achieves a uniform optical intensity distribution of the excitation light on the wavelength converter 20, which will be described later, or what is called a top-hat distribution. The homogenizer optical system 12 superimposes, along with the condenser optical system 13, a plurality of thin luminous fluxes having exited out of a plurality of lenses of the first multi-lens array 12a and the second multi-lens array 12b on one another on the wavelength converter 20. The light intensity distribution of the excitation light E radiated on the wavelength converter 20 is thus made uniform.

The condenser optical system 13 includes, for example, a first lens 13a and a second lens 13b. In the present embodiment, the first lens 13a and the second lens 13b are each formed of a convex lens. The condenser optical system 13 is disposed in the optical path from the homogenizer optical system 12 to the wavelength converter 20, collects the excitation light E, and causes the collected excitation light E to enter the wavelength converter 20. The configuration of the wavelength converter 20 will be described later.

The pickup optical system 30 includes, for example, a first collimation lens 31 and a second collimation lens 32. The pickup optical system 30 is a parallelizing optical system that substantially parallelizes the light having exited out of the wavelength converter 20. The first collimation lens 31 and the second collimation lens 32 are each formed of a convex lens. The light parallelized by the pickup optical system 30 enters the uniform illumination optical system 80.

The uniform illumination system 80 includes a first lens array 81, a second lens array 82, a polarization converter 83, and a superimposing lens 84.

The first lens array 81 includes a plurality of first lenses 81a for dividing the illumination light WL from the light source apparatus 2 into a plurality of sub-luminous fluxes. The plurality of first lenses 81a are arranged in a matrix in a plane perpendicular to the illumination optical axis 100ax.

The second lens array 82 includes a plurality of second lenses 82a corresponding to the plurality of first lenses 81a in the first lens array 81. The plurality of second lenses 82a are arranged in a matrix in a plane perpendicular to the illumination optical axis 100ax.

The second lens array 82 along with the superimposing lens 84 brings images of the first lenses 81a in the first lens array 81 into focus in the vicinity of an image formation region of each of the light modulators 4R, 4G, and 4B.

The polarization converter 83 converts the light having exited out of the second lens array 82 into linearly polarized light. The polarization converter 83 includes, for example, polarization separation films and retardation films (not shown).

The superimposing lens 84 collects the sub-luminous fluxes having exited out of the polarization converter 83 and superimposes the collected sub-luminous fluxes on one another in the vicinity of the image formation region of each of the light modulators 4R, 4G, and 4B.

Wavelength Converter

The configuration of the wavelength converter will next be described.

Figure 3:
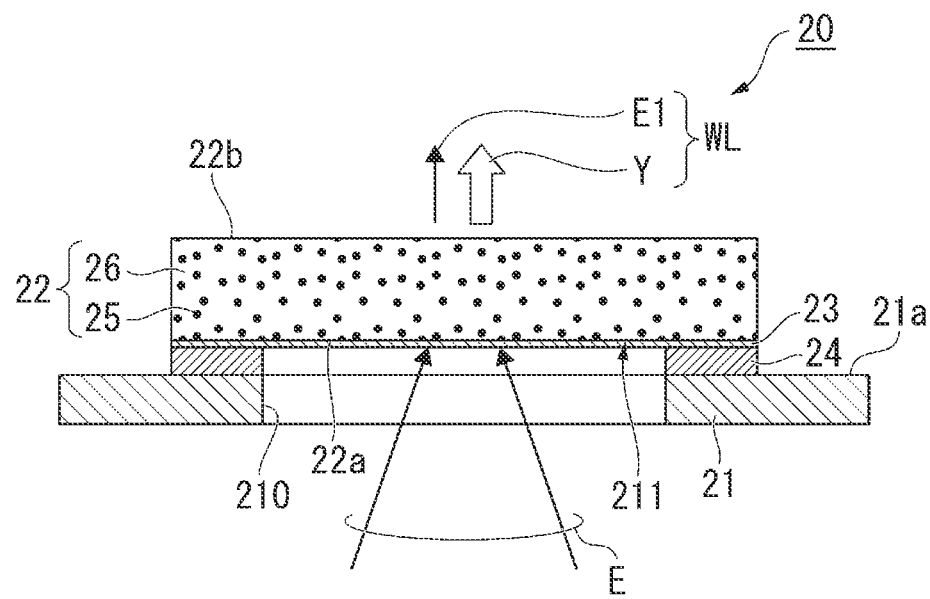
FIG. 3 is a cross-sectional view showing the configurations of key parts of a wavelength converter.

FIG. 3 is a cross-sectional view showing the configurations of key parts of the wavelength converter 20. FIG. 3 corresponds to the cross section of the wavelength converter 20 taken along a plane containing the illumination optical axis 100ax in FIG. 2.

The wavelength converter 20 in the present embodiment includes a substrate 21, a ceramic phosphor 22, a dichroic layer (optical layer) 23, and a bonding member 24, as shown in FIG. 3. The wavelength converter 20 in the present embodiment is an immobile phosphor so configured that the position where the excitation light E enters the ceramic phosphor 22 does not change over time.

The substrate 21 is made of a metal material that excels in heat dissipation, for example, aluminum or copper. The substrate 21 is a support member that supports the ceramic phosphor 22. The substrate 21 in the present embodiment is formed of a non-light-transmissive member. The thermal conductivity of the substrate 21 in the present embodiment is higher than that of the that of the ceramic phosphor 22. The substrate 21 has a support surface 21a, which supports the ceramic phosphor 22.

The ceramic phosphor 22 has a first surface 22a and a second surface 22b different from the first surface 22a. The first surface 22a is the surface on which the excitation light E outputted from the excitation light source 10 is incident. The second surface 22b is the surface via which fluorescence Y exits. The ceramic phosphor 22 in the present embodiment is a transmissive wavelength converter that causes the fluorescence Y generated by the excitation light E incident via the first surface 22a to exit via the second surface 22b, which is opposite from the first surface 22a.

The ceramic phosphor 22 has a phosphor phase 25 and a matrix phase 26. The phosphor phase 25 contains an oxide phosphor to which an activator has been added. The phosphor phase 25 contains, for example, yttrium aluminum garnet ($YAG(Y_3Al_5O_{12})$:Ce) to which cerium (Ce) has been added as the activator.

Consider YAG:Ce by way of example, and phosphor particles can be made, for example, of a material produced by mixing raw powder materials containing $Y_2O_3$, $Al_2O_3$, $CeO_3$, and other constituent elements with one another and causes the mixture to undergo a solid-phase reaction, Y—Al—O amorphous particles produced by using a coprecipitation method, a sol-gel method, or any other wet method, or YAG particles produced by using a spray-drying method, a flame-based thermal decomposition method, a thermal plasma method, or any other gas-phase method.

The oxide phosphor that forms the phosphor phase 25 may include at least one of $Y_3(Al, Ga)_5O_{12}$, $Lu_3Al_5O_{12}$, and $TbAl_5O_{12}$ in addition to $Y_3Al_5O_{12}$. The phosphor phase 25 may contain europium (Eu) in place of cerium (Ce) as the activator.

The matrix phase 26 functions as a binder that binds a plurality of phosphor particles that form the phosphor phase 25 together. The matrix phase 26 is made of a material containing MgO (magnesium oxide) as a light transmissive ceramic material. The thermal conductivity of the magnesium oxide, which forms the matrix phase 26, is about 50 W/m·K, and the thermal conductivity of YAG, which forms the phosphor phase 25, is about 12 W/m·K. In the present embodiment, the light transmissive ceramic material contained in the matrix phase 26 has thermal conductivity higher than that of the phosphor phase 25.

The metal oxide that forms the matrix phase 26 may contain at least one of $Al_2O_3$, ZnO, $TiO_2$, $Y_2O_3$, $YAlO_3$, BeO, and $MgAl_2O_4$ in addition to MgO described above.

The thermal conductivity of $Al_2O_3$ is about 30 W/m·K, the thermal conductivity of ZnO is about 25 W/m·K, the thermal conductivity of $TiO_2$ is about 43 W/m·K, the thermal conductivity of $Y_2O_3$ is about 27 W/m·K, the thermal conductivity of $YAlO_3$ is about 12 W/m·K, the thermal conductivity of BeO is about 250 W/m·K, and the thermal conductivity of $MgAl_2O_4$ is about 14 W/m·K.

The thus configured ceramic phosphor 22 can be manufactured, for example, by the following steps.

Predetermined amounts of $Al_2O_3$ powder, $Y_2O_3$ powder, and $CeO_2$ powder, which are raw material powder of YAG:Ce, are mixed with a predetermined amount of ethanol, and ball milling is performed on the mixture in a pot to produce slurry. The slurry is dried, granulated, then degreased, and sintered to produce YAG:Ce powder.

A predetermined amount of YAG:Ce powder produced by carrying out the steps described above is mixed with a predetermined amount of MgO powder and a predetermined amount of ethanol, and ball milling is performed on the mixture in a pot to produce slurry. The slurry is then dried, granulated, molded, degreased, and sintered in the presented order to produce the ceramic phosphor 22 in the present embodiment, which is made of a composite sintered compact of YAG:Ce, YAG, and MgO (magnesium oxide). To increase the density of the sintered compact, a hot isotropic pressing process of sintering the compact under pressure may be additionally performed.

The dichroic layer 23 is provided at the first surface 22a of the ceramic phosphor 22 and serves as a reflective layer that reflects light having a specific wavelength. The dichroic layer 23 is characterized in that it transmits the excitation light E and reflects the fluorescence Y emitted from the ceramic phosphor 22. Providing the dichroic layer 23 prevents the fluorescence Y generated in the ceramic phosphor 22 from exiting out thereof via the first surface 22a. The fluorescence Y generated in the ceramic phosphor 22 can thus be efficiently extracted from the ceramic phosphor 22.

A through hole (opening) 210 is formed in the substrate 21 in the present embodiment. Part of the first surface 22a of the ceramic phosphor 22 is exposed via the through hole 210. In the ceramic phosphor 22, a portion of the first surface 22a that is the portion exposed via the through hole 210 is hereinafter referred to as an exposed portion 211. In the ceramic phosphor 22 in the present embodiment, the excitation light E is incident on the exposed portion 211.

The ceramic phosphor 22 is bonded to the substrate 21 via the bonding member 24. The bonding material 24 in the present embodiment contains electrically conductive fillers having high thermal conductivity. For example, at least one of metal, $Al_2O_3$, $ZrO_2$, MgO, and AlN is used as the material of the electrically conductive fillers contained in the bonding member 24. Using the bonding member 24 containing the electrically conductive fillers allows heat of the ceramic phosphor 22 to be efficiently transferred toward the substrate 21.

The substrate 21 is in contact with a region of the ceramic phosphor 22 that is the region different from the excitation light incident region. The substrate 21 therefore also functions as a member that dissipates the heat generated in the ceramic phosphor 22. The substrate 21 except for the through hole 210 is in contact with the ceramic phosphor 22.

The ceramic phosphor 22 in the present embodiment outputs the white illumination light WL, which is the combination of blue light (transmitted light) E1, which is a portion of the blue excitation light E outputted from the excitation light source 10 that is the portion 22b that has not been converted in terms of wavelength but directly exits via the second surface, and the yellow fluorescence Y generated by the ceramic phosphor 22 through the wavelength conversion of the excitation light E.

The white balance of the illumination light WL emitted from the ceramic phosphor 22 is determined by the ratio between the amount of the blue light E1 and the amount of the fluorescence Y. In the present specification, the ratio between the two types of light is hereinafter referred to as a BY ratio. The condition under which a practical white balance of the illumination light WL used in the projector is that the BY ratio ranges from 30% to 50%.

It has been ascertained that the BY ratio is affected by the thickness of the ceramic phosphor 22. For example, relatively reducing the thickness of the ceramic phosphor 22 allows an increase in the amount of the blue light E1 passing through the ceramic phosphor 22. The thickness of the ceramic phosphor 22 smaller than 40 µm, however, makes it difficult to manufacture the ceramic phosphor 22. It is therefore desirable to set the lower limit of the thickness of the ceramic phosphor 22 at 40 µm from a manufacturing viewpoint.

On the other hand, relatively increasing the thickness of the ceramic phosphor 22 causes a decrease in the amount of the blue light E1 passing through the ceramic phosphor 22. Furthermore, the thickness of the ceramic phosphor 22 greater than 150 µm tends to increase the amount of the fluorescence Y reabsorbed by the ceramic phosphor 22, undesirably resulting in a decrease in the amount of the fluorescence Y extractable via the second surface 22b. It is therefore desirable to set the upper limit of the thickness of the ceramic phosphor 22 at 150 µm from a viewpoint of efficiency of utilization of the fluorescence Y.

Based on the viewpoints described above, in the light source apparatus 2 according to the present embodiment, the thickness of the ceramic phosphor 22 is set at a value greater than or equal to 40 µm but smaller than or equal to 150 µm.

In general, the width of the fluorescence emission region of a phosphor is wider than the width of the excitation light incident region of the phosphor. This is because the excitation light having entered the phosphor is diffused and propagates beyond the excitation light incident region, resulting in an increase in the width of the fluorescence emission region or what is called fluorescence bleeding.

Figure 4:
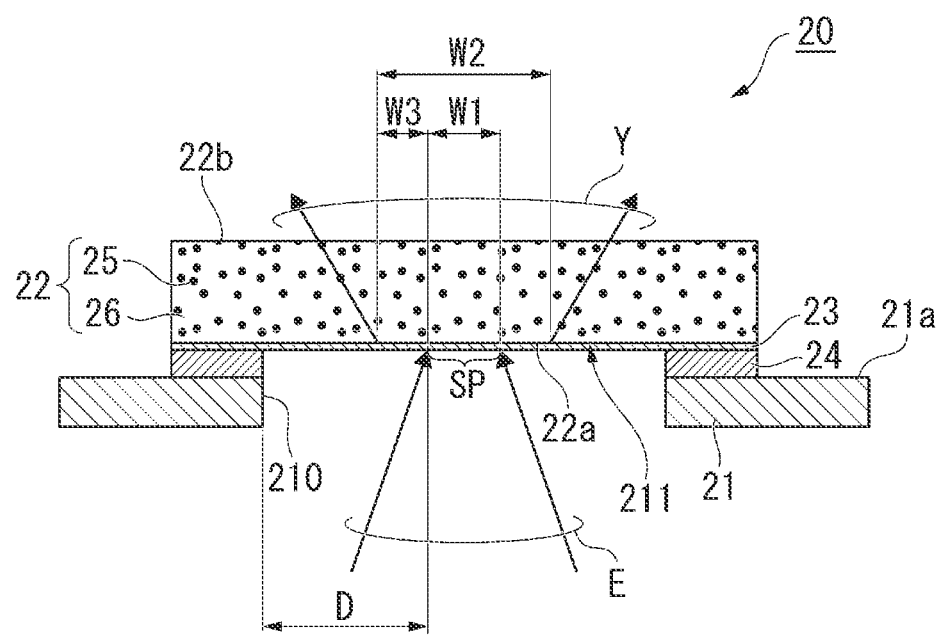
FIG. 4 shows the state in which a ceramic phosphor emits fluorescence.

FIG. 4 shows the state in which the ceramic phosphor 22 emits the fluorescence.

In the light source apparatus 2 according to the present embodiment, an irradiated region SP, which is irradiated with the excitation light E, is formed on the exposed portion 211 of the ceramic phosphor 22. In the ceramic phosphor 22 in the present embodiment, a width W2 of the light emission region of the exposed portion 211 that is the region from which the fluorescence Y is emitted is greater than a width W1 of the irradiated region SP due to the fluorescence bleeding, as shown in FIG. 4. The difference between the width W2 of the light emission region, from which the fluorescence Y is emitted, and the width W1 of the irradiated region SP corresponds to a spread width W3 over which the fluorescence Y spreads due to the bleeding, as shown in FIG. 4.

Consider now a case where the light emission region of the exposed portion 211, which is the region from which the fluorescence Y is emitted, reaches the substrate 21 due to the bleeding. The state in which the light emission region, from which the fluorescence Y is emitted, reaches the substrate 21 is the same as the state in which the excitation light E reaches the substrate 21. Therefore, when the light emission region, from which the fluorescence Y is emitted, reaches the substrate 21, part of the excitation light E is directly incident on and absorbed by the substrate 21, resulting in loss of the excitation light E.

In contrast, in the light source apparatus 2 according to the present embodiment, the distance in the exposed portion 211 from the irradiated region SP, which is irradiated with the excitation light E, to the substrate 21 is greater than a predetermined value, so that the excitation light E having entered the ceramic phosphor 22 is not directly incident on the substrate 21.

Figure 5:
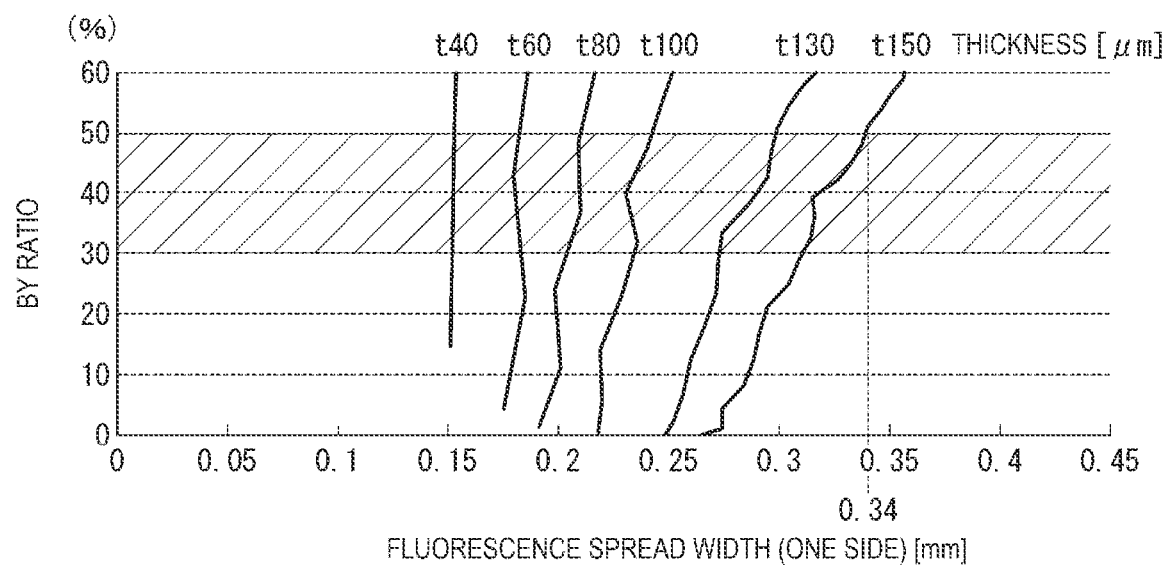
FIG. 5 shows the relationship between a spread width over which the fluorescence spreads due to bleeding and a BY ratio.

FIG. 5 shows the relationship between the spread width, over which fluorescence spreads due to the bleeding, and the BY ratio. The horizontal axis of FIG. 5 represents the spread width W3 (in mm), over which the fluorescence spreads due to the bleeding, shown in FIG. 4. The vertical axis of FIG. 5 corresponds to the BY ratio (in %). The graphs in FIG. 5 show the relationship between the fluorescence spread width and the BY ratio in ceramic phosphors 22 having different thicknesses.

FIG. 5 shows that the bleeding width, over which the fluorescence Y bleeds, increases as the thickness of the ceramic phosphor 22 increases from 40 to 150 µm.

For example, using the ceramic phosphor 22 having the lower limit thickness (40 µm) demonstrates that the spread width, over which the fluorescence Y spreads due to the bleeding, is about 0.15 mm to achieve a desired white balance (BY ratio from 30% to 50%) of the illumination light WL emitted from the ceramic phosphor 22.

On the other hand, using the ceramic phosphor 22 having the upper limit thickness (150 µm) demonstrates that the spread width, over which the fluorescence Y spreads due to the bleeding, is about 0.31 mm to achieve a desired white balance (BY ratio of 30%) of the illumination light WL emitted from the ceramic phosphor 22. Using the ceramic phosphor 22 having the upper limit thickness demonstrates that the spread width, over which the fluorescence Y spreads, is about 0.34 mm to achieve a desired white balance (BY ratio of 50%) of the illumination light WL.

In the light source apparatus 2 according to the present embodiment, to achieve the desired white balance (BY ratio from 30% to 50%) by using any of the ceramic phosphors 22 having thicknesses ranging from 40 to 150 µm, the substrate 21 is separated by a value greater than the maximum of the spread width (0.34 mm), over which the fluorescence Y spreads.

In the light source apparatus 2 according to the present embodiment, the distance D in the exposed portion 211 from the irradiated region SP, which is irradiated with the excitation light E, to the through hole 210 in the substrate 21 is set at 0.34 mm or greater. The configuration described above prevents the excitation light E from reaching the substrate 21 even when the ceramic phosphor 22 having the thickness of 150 µm, which maximizes the spread width, over which the fluorescence Y spreads due to the bleeding, to achieve the white balance corresponding to the BY ratio of 50%. The distance D is defined as the distance between the irradiated region SP and the inner surface of the through hole 210 in the direction along the support surface 21a of the substrate 21.

Effects of First Embodiment

The light source apparatus 2 according to the present embodiment includes the excitation light source 10, which outputs the excitation light E, the ceramic phosphor 22 having the first surface 22a, and the substrate 21, which supports the first surface 22a of the ceramic phosphor 22. The excitation light E outputted from the excitation light source 10 is incident on the exposed portion 211 of the first surface 22a, which is the portion exposed via the substrate 21, and the distance D in the exposed portion 211 from the irradiated region SP, which is irradiated with the excitation light E, to the substrate 21 is 0.34 mm or greater.

In the light source apparatus 2 according to the present embodiment, since the excitation light E is directly incident on the ceramic phosphor 22 via the exposed portion 211, the excitation light E can be used more efficiently than in a configuration in which the excitation light is incident on the phosphor via a light transmissive substrate.

The light source apparatus 2 according to the present embodiment, in which the distance D from the irradiated region SP, which is irradiated with the excitation light E, to the substrate 21 is 0.34 mm or greater in the exposed portion 211, suppresses a situation in which the excitation light E, which may be irregularly reflected in the ceramic phosphor 22 and may cause the bleeding of the fluorescence Y, is directly incident on the substrate 21. The amount of the excitation light E absorbed by the substrate 21 is thus suppressed, whereby the efficiency of the conversion into the fluorescence Y can be improved by improvement in the efficiency of the utilization of the excitation light E.

In the light source apparatus 2 according to the present embodiment, it is desirable that the thickness of the ceramic phosphor 22 is greater than or equal to 40 μm but smaller than or equal to 150 μm, that the ceramic phosphor 22 has the second surface 22b different from the first surface 22a, that part of the excitation light E with which the exposed portion 211 of the first surface 22a is irradiated is converted in terms of wavelength to generate the fluorescence Y and the fluorescence Y exits via the second surface 22b, that the blue light E1, which is the other part of the excitation light E, exits via the second surface 22b, and that the BY ratio between blue light E1 and fluorescence Y ranges from 30% to 50%.

The illumination light WL having a proper white balance can thus be generated by setting the BY ratio at a value ranging from 30% to 50%. Furthermore, the ceramic phosphor 22 can be readily manufactured by setting the thickness of the ceramic phosphor 22 at a value greater than or equal to 40 μm but smaller than or equal to 150 μm.

In the light source apparatus 2 according to the present embodiment, the substrate 21 is formed of a non-light-transmissive member having thermal conductivity higher than that of the ceramic phosphor 22.

According to the configuration described above, since the substrate 21 is formed of a non-light-transmissive member, loss of the excitation light E due to leakage thereof into the substrate 21 can be suppressed. Furthermore, the heat of the ceramic phosphor 22 can be dissipated via the substrate 21.

In the light source apparatus 2 according to the present embodiment, the exposed portion 211 of the ceramic phosphor 22 is exposed via the through hole 210 formed in the substrate 21.

According to the configuration described above, the exposed portion 211 can be readily configured, whereby the configuration of the light source apparatus itself can be downsized.

The light source apparatus 2 according to the present embodiment further includes the dichroic layer 23, which is provided at the first surface 22a of the ceramic phosphor 22, transmits the excitation light E, and reflects the fluorescence Y.

According to the configuration described above, the dichroic layer 23 provided at the first surface 22a prevents the fluorescence Y generated in the ceramic phosphor 22 from exiting out thereof via the first surface 22a. The fluorescence Y generated in the ceramic phosphor 22 can thus be efficiently extracted from the ceramic phosphor 22.

The projector 1 according to the present embodiment includes the light source apparatus 2, the light modulators 4R, 4G, and 4B, which modulate the light outputted from the light source apparatus 2 in accordance with image information to form image light, and the projection optical apparatus 6, which projects the image light.

In the projector 1 according to the present embodiment, the image light is generated by using bright illumination light WL generated by the light source apparatus 2 described above, whereby the projector 1 can display high-quality images.

Second Embodiment

A second embodiment of the present disclosure will be described below with reference to FIG. 6.

The schematic configuration of the projector according to the second embodiment is the same as that in the first embodiment, but the configuration of the wavelength converter in the light source apparatus differs from that in the first embodiment. The configuration of the wavelength converter will therefore be described below, and the other configurations will not be described.

Figure 6:
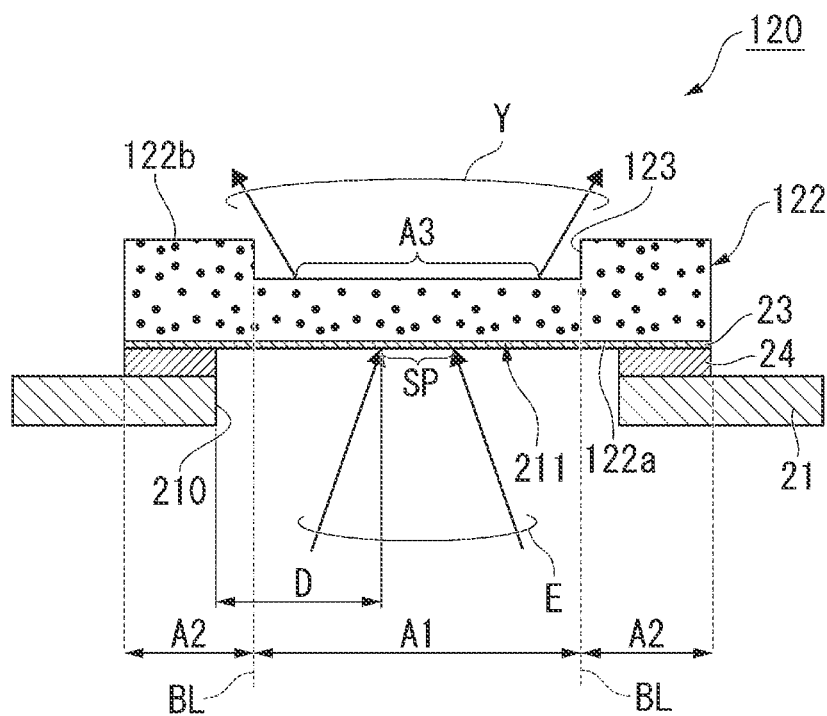
FIG. 6 is a cross-sectional view showing the configurations of key parts of the wavelength converter in a second embodiment.

FIG. 6 is a cross-sectional view showing the configurations of key parts of the wavelength converter in the present embodiment. A wavelength converter 120 in the present embodiment includes the substrate 21, a ceramic phosphor 122, the dichroic layer 23, and the bonding member 24, as shown in FIG. 6.

The ceramic phosphor 122 has a first surface 122a and a second surface 122b. The first surface 122a is the surface on which the excitation light E outputted from the excitation light source 10 is incident. The second surface 122b is the surface via which the fluorescence Y exits. The ceramic phosphor 122 has a recess 123 formed at the second surface 122b.

In the present embodiment, the ceramic phosphor 122 has a first region A1 and a second region A2. The first region A1 is a region which contains the irradiated region SP, which is irradiated with the excitation light E, and where the recess 123 described above is provided. The second region A2 is a region that differs from the first region A1 and surrounds the first region A1. The second region A2 is a region shifted toward the substrate 21 (outward) from a fluorescence exiting region A3, from which the fluorescence Y exits, in a plan view viewed from the side facing the second surface 122b. That is, the fluorescence Y does not exit from the second region A2.

In the present embodiment, the first region A1, which is provided with the recess 123 as described above, is thinner than the second region A2. The thicknesses of the first region A1 and the second region A2 are each greater than or equal to 40 μm but smaller than or equal to 150 μm.

In the ceramic phosphor 122, a boundary BL between the first region A1 and the second region A2 is located between the irradiated region SP, which is irradiated with the excitation light E, and the substrate 21, so the first region A1, which is relatively thin, is not disposed on the substrate 21. In the thickness direction of the substrate 21 (vertical direction in FIG. 6), part of the second region A2 overlaps with the substrate 21. That is, the second region A2 is bonded to the substrate 21 via the bonding member 24.

Also in the wavelength converter 120 in the present embodiment, the distance D, in the exposed portion 211 from the irradiated region SP, which is irradiated with the excitation light E, to the substrate 21 is set at 0.34 mm or greater.

Effects of Second Embodiment

In the wavelength converter 120 in the present embodiment, the thickness of the first region A1, on which the excitation light E is incident, is relatively thin, whereby the situation in which the fluorescence Y is guided in the ceramic phosphor 122 can be suppressed, so that an increase in the area of the fluorescence exiting region A3 can be suppressed. An increase in the etendue of the fluorescence Y can therefore be suppressed. Furthermore, since the second region A2, which is located outside the fluorescence exiting region A3 and bonded to the substrate 21, is relatively thicker, the thermal resistance of the path along which the heat generated in the first region A1 is dissipated to the substrate 21 can be reduced. The heat dissipation capability of the ceramic phosphor 122 can thus be improved, whereby the efficiency of the conversion into the fluorescence Y can be improved and bright fluorescence Y can be generated.

Furthermore, in the wavelength converter 120 in the present embodiment, the second region A2, which is relatively thick, is bonded to the substrate 21, so that the shear strength of the ceramic phosphor 122 can be improved, whereby damage to the ceramic phosphor 122 can be suppressed.

Therefore, in the light source apparatus including the wavelength converter 120 according to the present embodiment, the amount of excitation light E absorbed by the substrate 21 is suppressed so that the excitation light E is efficiently utilized, whereby the efficiency of the conversion into the fluorescence Y is improved, and bright illumination light WL can therefore be generated.

Third Embodiment

A third embodiment of the present disclosure will be described below with reference to FIG. 7.

The schematic configuration of the projector according to the third embodiment is the same as that in the first embodiment, but the configuration of the wavelength converter in the light source apparatus differs from that in the first embodiment. The configuration of the wavelength converter will therefore be described below, and the other configurations will not be described.

Figure 7:
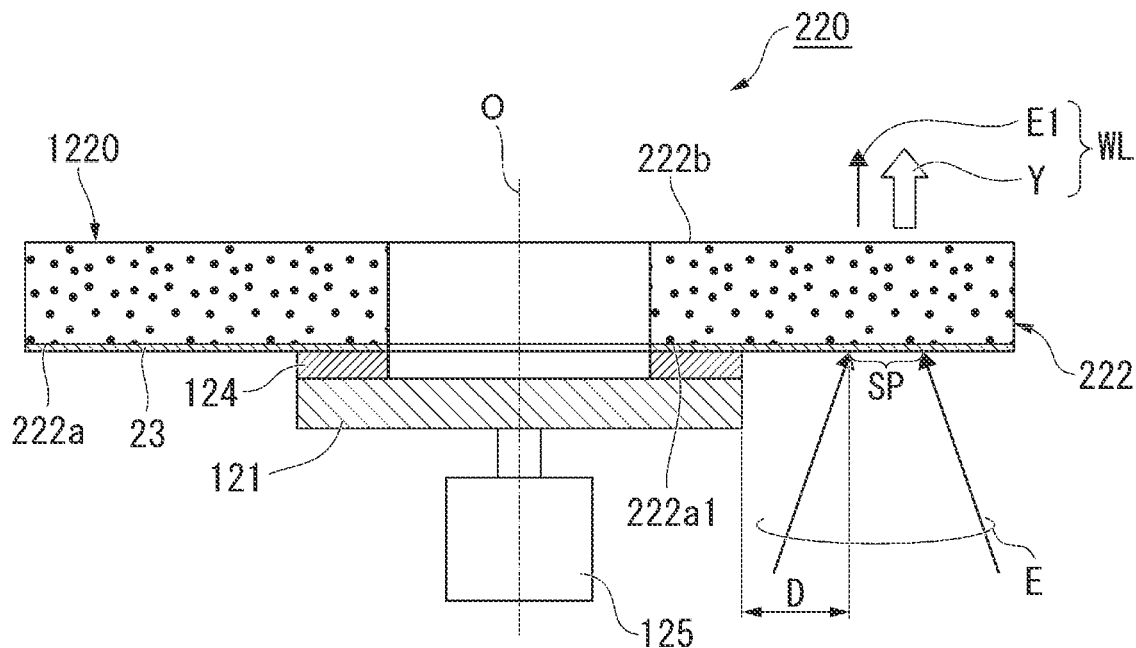
FIG. 7 is a cross-sectional view showing the configurations of key parts of the wavelength converter in a third embodiment.

FIG. 7 is a cross-sectional view showing the configurations of key parts of the wavelength converter in the present embodiment. A wavelength converter 220 in the present embodiment includes a substrate 121, a ceramic phosphor 222, the dichroic layer 23, and a motor 125, as shown in FIG. 7. The wavelength converter 220 in the present embodiment is a rotary-wheel-type wavelength converter so configured that the position where the excitation light E enters the ceramic phosphor 222 changes over time.

The substrate 121 is made of a metal material that excels in heat dissipation, such as aluminum or copper. The substrate 121 is a rotating substrate rotatable around a predetermined axis of rotation O. The axis of rotation O passes through the center of the substrate 121. The motor 125 rotates the disc-shaped substrate 121 around the axis of rotation O.

The ceramic phosphor 222 in the present embodiment is formed in an annular shape around the axis of rotation O. The ceramic phosphor 222 is formed by shaping the ceramic phosphor 22 in the first embodiment into a ring. The dichroic layer 23 is provided between the substrate 121 and the ceramic phosphor 222. The substrate 121 dissipates the heat generated by the ceramic phosphor 222.

The dichroic layer 23 is provided at a first surface 222a of the ceramic phosphor 222. In the annular ceramic phosphor 222, the first surface 222a has a radially inner end section 222a1 fixed to the substrate 21 via the bonding member 24. That is, in the plan view viewed in the direction along the axis of rotation O, the ceramic phosphor 222 is provided so as to protrude outward beyond the substrate 121 in the radial direction. The excitation light E is incident on an overhanging portion (exposed portion) 1220 of the ceramic phosphor 222, which is the portion extending outward beyond the substrate 121 in the radial direction. In the present embodiment, the substrate 21 is in contact with a region of the ceramic phosphor 222 that is the region different from the region on which the excitation light E is incident and dissipates the heat generated by the ceramic phosphor 322.

In the wavelength converter 220 in the present embodiment, the excitation light E is incident on the overhanging portion 1220 of the rotating ceramic phosphor 222. When the excitation light E enters the ceramic phosphor 222, heat is generated in the overhanging portion 1220 of the ceramic phosphor 222. In the present embodiment, in which the motor 125 rotates the ceramic phosphor 222, the position where the excitation light E is incident on the overhanging portion 1220 of the ceramic phosphor 222 is moved over time. The configuration described above prevents degradation of the ceramic phosphor 222 that occurs when only part of the ceramic phosphor 222 is locally heated by constant radiation of the excitation light E to the same position on the overhanging portion 1220 of the ceramic phosphor 222.

In the present embodiment, in which the ceramic phosphor 222 is rotated, the heat dissipation capability of the ceramic phosphor 222 can be further increased.

Also in the wavelength converter 220 in the present embodiment, the substrate 121 in contact with the ceramic phosphor 222 is formed of a non-light-transmissive member. Therefore, in the wavelength converter 220, the fluorescence Y generated by the ceramic phosphor 222 is efficiently extracted out thereof without leaking out into the substrate 121.

Also in the wavelength converter 220 in the present embodiment, the distance D in the overhanging portion 1220 from the irradiated region SP, which is irradiated with the excitation light E, to the substrate 121 is set at 0.34 mm or greater.

Effects of Third Embodiment

In the light source apparatus including the wavelength converter 220 according to the present embodiment, which uses the rotating wavelength converter, the amount of excitation light E absorbed by the substrate 121 can be suppressed so that the excitation light E can be efficiently utilized, as in the first embodiment. Furthermore, the improvement in the heat dissipation capability of the ceramic phosphor 222 can suppress a decrease in the amount of fluorescence due to a decrease in the wavelength conversion efficiency of the ceramic phosphor 222.

Fourth Embodiment

A fourth embodiment of the present disclosure will be described below with reference to FIG. 8.

The schematic configuration of the projector according to the fourth embodiment is the same as that in the third embodiment, but the configuration of the wavelength converter in the light source apparatus differs from that in the third embodiment. Specifically, the wavelength converter in the present embodiment has a structure that is the combination of the wavelength converter in the third embodiment and the wavelength converter in the second embodiment. The configuration of the wavelength converter will be described below, and the other configurations will not be described.

Figure 8:
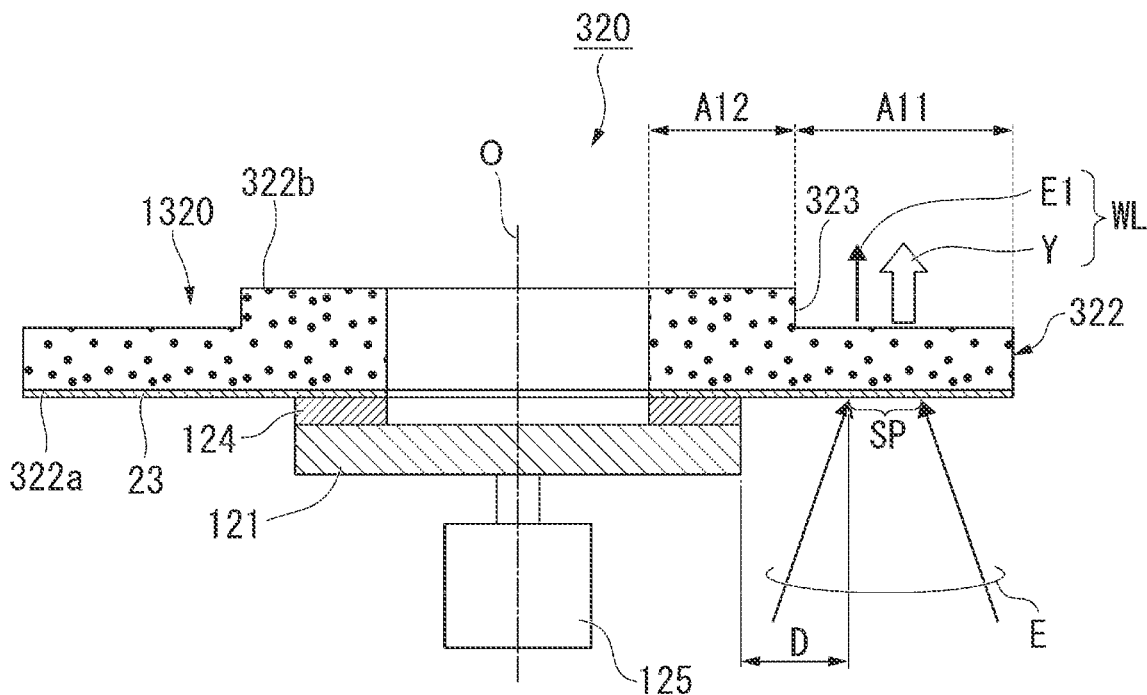
FIG. 8 is a cross-sectional view showing the configurations of key parts of the wavelength converter in a fourth embodiment.

FIG. 8 is a cross-sectional view showing the configurations of key parts of the wavelength converter in the present embodiment.

A wavelength converter 320 in the present embodiment includes the substrate 121, a ceramic phosphor 322, the dichroic layer 23, and the motor 125, as shown in FIG. 8.

The wavelength converter 320 in the present embodiment is a rotary-wheel-type wavelength converter so configured that the position where the excitation light E enters the ceramic phosphor 322 changes over time.

The ceramic phosphor 322 has a first surface 322a, on which the excitation light E outputted from the excitation light source 10 is incident, and a second surface 322b, via which the fluorescence Y exits. The ceramic phosphor 322 has a recess 323 formed in a predetermined region of the second surface 322b.

The ceramic phosphor 322 in the present embodiment has a first region A11 and a second region A12. The first region A11 is a region which contains the irradiated region SP, which is irradiated with the excitation light E, and where the recess 323 described above is provided. The second region A12 is a region that differs from the first region A11 and is a ring-shaped region shifted inward from the first region A11 in the radial direction. The first region A11 is thinner than the second region A12. In the present embodiment, an overhanging portion 1320 of the ceramic phosphor 322 is formed of the first region A11 and part of the second region A12. In the present embodiment, the first region A11, which is provided with the recess 323 as described above, is thinner than the second region A12. The thicknesses of the first region A11 and the second region A12 are each greater than or equal to 40 μm but smaller than or equal to 150 μm.

In the thickness direction of the substrate 121 (vertical direction in FIG. 8), part of the second region A12 overlaps with the substrate 121. That is, the second region A12 is bonded to the substrate 121 via the bonding member 24. In the ceramic phosphor 322, a boundary BL between the first region A11 and the second region A12 is located between the irradiated region SP, which is irradiated with the excitation light E, and the substrate 121. Also in the wavelength converter 320 in the present embodiment, the distance D in the overhanging portion 1220 from the irradiated region SP, which is irradiated with the excitation light E, to the substrate 121 is set at 0.34 mm or greater.

Effects of Fourth Embodiment

In the wavelength converter 320 in the present embodiment, which uses the rotating wavelength converter, the improvement in the heat dissipation capability of the ceramic phosphor 322 can improve the fluorescence conversion efficiency to generate bright fluorescence Y, as in the second embodiment. Furthermore, bonding the ceramic phosphor 322 to the substrate 121 in the second region A12 can suppress damage to the ceramic phosphor 322. Moreover, the improvement in the heat dissipation capability of the ceramic phosphor 322 improves the efficiency of the conversion into the fluorescence Y, whereby brighter illumination light WL can be generated.

The technical scope of the present disclosure is not limited to the embodiments described above, and a variety of changes can be made thereto to the extent that the changes do not depart from the substance of the present disclosure.

For example, the aforementioned embodiments have been described with reference to the case where the entire substrates 21 and 121 are each formed of a non-light-transmissive member (made of metal) by way of example. It is, however, noted that light leakage of the fluorescence Y can be avoided as long as at least a portion of each of the substrates 21 and 121 that is the portion in contact with any of the ceramic phosphors 22, 122, 222, and 322 is formed of a non-light-transmissive member. The substrates 21 and 121 may therefore be each formed of a light-transmissive member except for the portion in contact with any of the ceramic phosphors 22, 122, 222, and 322.

For example, in the ceramic phosphors 22, 122, 222, and 322 in the embodiments described above, the phosphor phase 25 contains an oxide phosphor, and the matrix phase 26 contains a metal oxide. In place of the configuration described above, the phosphor phase 25 may contain a nitride phosphor, and the matrix phase 26 may contain a metal nitride. The nitride phosphor can be a sialon phosphor made, for example, of α-SiAlON or β-SiAlON. The metal nitride can, for example, be AlN. The thermal conductivity of AlN is about 255 W/m·K. When the phosphor phase 25 contains a nitride phosphor, and the matrix phase 26 contains a metal oxide, the ceramic phosphor can be stably manufactured, for example, without unnecessary oxidation reactions in each of the phases.

In addition to the above, the specific descriptions of the shape, the number, the arrangement, the material, the manufacturing method, and other factors of the components of the light source apparatus and the projector are not limited to those in the embodiments described above and can be changed as appropriate. The above embodiments have been described with reference to the case where the light source apparatus according to the present disclosure is incorporated in a projector using liquid crystal light valves, but not necessarily. The light source apparatus according to the present disclosure may be incorporated in a projector using a digital micromirror device as each of the light modulators.

The aforementioned embodiments have been described with reference to the case where the light source apparatus according to the present disclosure is incorporated in a projector, but not necessarily. The light source apparatus according to the present disclosure may be used as a lighting apparatus, a headlight of an automobile, and other components.

A light source apparatus according to an aspect of the present disclosure may have the configuration below.

A light source apparatus according to an aspect of the present disclosure includes an excitation light source that outputs excitation light, a ceramic phosphor that has a first surface and a second surface, converts in terms of wavelength part of the excitation light outputted from the excitation light source and incident via the first surface to generate fluorescence, and causes the fluorescence to exit via the second surface, and a substrate that supports the first surface of the ceramic phosphor. The excitation light outputted from the excitation light source is incident on an exposed portion of the first surface of the ceramic phosphor that is the portion exposed via the substrate. The distance in the exposed portion from an irradiated region irradiated with the excitation light to the substrate is 0.34 mm or greater.

In the light source apparatus according to the aspect of the present disclosure, the thickness of the ceramic phosphor may be greater than or equal to 40 μm but smaller than or equal to 150 μm. The ceramic phosphor may cause the other part of the excitation light to exit as transmitted light along with the fluorescence via the second surface. The ratio between the amount of the transmitted light and the amount of the fluorescence emitted from the ceramic phosphor may range from 30% to 50%.

In the light source apparatus according to the aspect of the present disclosure, the ceramic phosphor may have a first region and a second region. The first region may be a region containing the excitation light irradiated region, and the second region may be a region shifted toward the substrate from a fluorescence exiting region from which the fluorescence exits. The first region may be thinner than the second region. The substrate may have thermal conductivity higher than that of the ceramic phosphor. In the thickness direction of the substrate, part of the second region may overlap with the substrate.

In the light source apparatus according to the aspect of the present disclosure, the boundary between the first region and the second region of the ceramic phosphor may be located between the excitation light irradiated region and the substrate.

In the light source apparatus according to the aspect of the present disclosure, the exposed portion of the ceramic phosphor may be exposed via an opening formed in the substrate.

The light source apparatus according to the aspect of the present disclosure may further include an optical layer that is provided at the first surface of the ceramic phosphor, transmits the excitation light, and reflects the fluorescence.

In the light source apparatus according to the aspect of the present disclosure, the substrate may be a rotating substrate that rotates around a predetermined axis of rotation. The ceramic phosphor may be provided so as to protrude outward beyond the substrate in the radial direction of the substrate. A portion of the ceramic phosphor that is the portion protruding beyond the substrate may be the exposed portion.

A projector according to another aspect of the present disclosure may have the configuration below.

The projector according to the other aspect of the present disclosure includes the light source apparatus according to the aspect of the present disclosure, a light modulator that modulates the light outputted from the light source apparatus in accordance with image information to form image light, and a projection optical apparatus that projects the image light.

What is claimed is:

1. A light source apparatus comprising:
an excitation light source that outputs excitation light;
a ceramic phosphor that has a first surface and a second surface, converts in terms of wavelength part of the excitation light outputted from the excitation light source and incident via the first surface to generate fluorescence, and causes the fluorescence to exit via the second surface, the ceramic phosphor further comprising a first region and a second region, the first region being thinner than the second region; and
a substrate that supports the first surface of the ceramic phosphor,
wherein the excitation light outputted from the excitation light source is incident on an exposed portion of the first surface of the ceramic phosphor that is a portion exposed via the substrate,
a distance in the exposed portion from an excitation light irradiated region irradiated with the excitation light to the substrate is 0.34 mm or greater,
the first region of the ceramic phosphor is a region containing the excitation light irradiated region,
the second region is a region shifted toward the substrate from a fluorescence exiting region from which the fluorescence exits, and
part of the second region overlaps with the substrate in a thickness direction of the substrate.

2. The light source apparatus according to claim 1, wherein a thickness of the ceramic phosphor is greater than or equal to 40 μm but smaller than or equal to 150 μm,
the ceramic phosphor causes another part of the excitation light to exit as transmitted light along with the fluorescence via the second surface, and
a ratio between the amount of the transmitted light and the amount of the fluorescence emitted from the ceramic phosphor ranges from 30% to 50%.

3. The light source apparatus according to claim 1, wherein the substrate is formed of a non-light-transmissive member having thermal conductivity higher than thermal conductivity of the ceramic phosphor.

4. The light source apparatus according to claim 1, wherein the exposed portion of the ceramic phosphor is exposed via an opening formed in the substrate.

5. The light source apparatus according to claim 1, wherein the substrate is a rotating substrate that rotates around a predetermined axis of rotation,
the ceramic phosphor is provided so as to protrude outward beyond the substrate in a radial direction of the substrate, and
a portion of the ceramic phosphor that is a portion protruding beyond the substrate is the exposed portion.

6. The light source apparatus according to claim 1, further comprising an optical layer that is provided at the first surface of the ceramic phosphor, transmits the excitation light, and reflects the fluorescence.

7. A projector comprising:
the light source apparatus according to claim 1;
a light modulator that modulates light outputted from the light source apparatus in accordance with image information to form image light; and
a projection optical apparatus that projects the image light.

8. A light source apparatus comprising:
an excitation light source that outputs excitation light;
a ceramic phosphor that has a first surface and a second surface, converts in terms of wavelength part of the excitation light outputted from the excitation light source and incident via the first surface to generate fluorescence, and causes the fluorescence to exit via the second surface, the ceramic phosphor further comprising a first region and a second region, the first region being thinner than the second region; and
a substrate that supports the first surface of the ceramic phosphor,
wherein the excitation light outputted from the excitation light source is incident on an exposed portion of the first surface of the ceramic phosphor that is a portion exposed via the substrate,
a distance in the exposed portion from an excitation light irradiated region irradiated with the excitation light to the substrate is 0.34 mm or greater,
the first region of the ceramic phosphor is a region containing the excitation light irradiated region,
the second region is a region shifted toward the substrate from a fluorescence exiting region from which the fluorescence exits,
part of the second region overlaps with the substrate in a thickness direction of the substrate, and
a boundary between the first region and the second region of the ceramic phosphor is located between the excitation light irradiated region and the substrate.

* * * * *